(12) United States Patent
Baron van Asbeck

(10) Patent No.: US 7,980,690 B2
(45) Date of Patent: Jul. 19, 2011

(54) COMBINED LENS AND SPECTACLES PROVIDED WITH AT LEAST ONE SUCH COMBINED LENS

(75) Inventor: Frederik Cornelis Willem Baron van Asbeck, 's-Hertogenbosch (NL)

(73) Assignee: Stichting Focus on Vision Foundation, TT Oss (NL)

( * ) Notice: Subject to any disclaimer, the term of this patent is extended or adjusted under 35 U.S.C. 154(b) by 462 days.

(21) Appl. No.: 11/908,841

(22) PCT Filed: Mar. 16, 2006

(86) PCT No.: PCT/NL2006/000140
§ 371 (c)(1), (2), (4) Date: Jun. 3, 2008

(87) PCT Pub. No.: WO2006/098618
PCT Pub. Date: Sep. 21, 2006

(65) Prior Publication Data
US 2009/0122425 A1    May 14, 2009

(30) Foreign Application Priority Data
Mar. 17, 2005   (NL) ...................................... 1028563

(51) Int. Cl.
*G02C 7/12* (2006.01)

(52) U.S. Cl. .......................................... 351/49; 351/47

(58) Field of Classification Search .................... 351/49, 351/47, 48, 57, 44, 41, 158; 359/699, 700, 359/701, 819, 823
See application file for complete search history.

(56) References Cited

U.S. PATENT DOCUMENTS

| | | | |
|---|---|---|---|
| 3,305,294 A | | 2/1967 | Alvarez |
| 5,210,552 A | * | 5/1993 | Baran et al. ..................... 351/49 |
| 5,444,512 A | | 8/1995 | Morizumi et al. |
| 5,721,969 A | | 2/1998 | Arai et al. |
| 5,790,225 A | * | 8/1998 | Flados ............................ 351/49 |
| 2002/0067552 A1 | | 6/2002 | Kazunori et al. |

* cited by examiner

*Primary Examiner* — Hung X Dang
(74) *Attorney, Agent, or Firm* — Smith Gambrell & Russell LLP

(57) ABSTRACT

The invention relates to a combined lens comprising two lens elements lying behind one another along the optical axis of the lens and means for displacing at least one lens element relative to the other lens element in a plane perpendicular to the optical axis of the lens.

Figure 1:
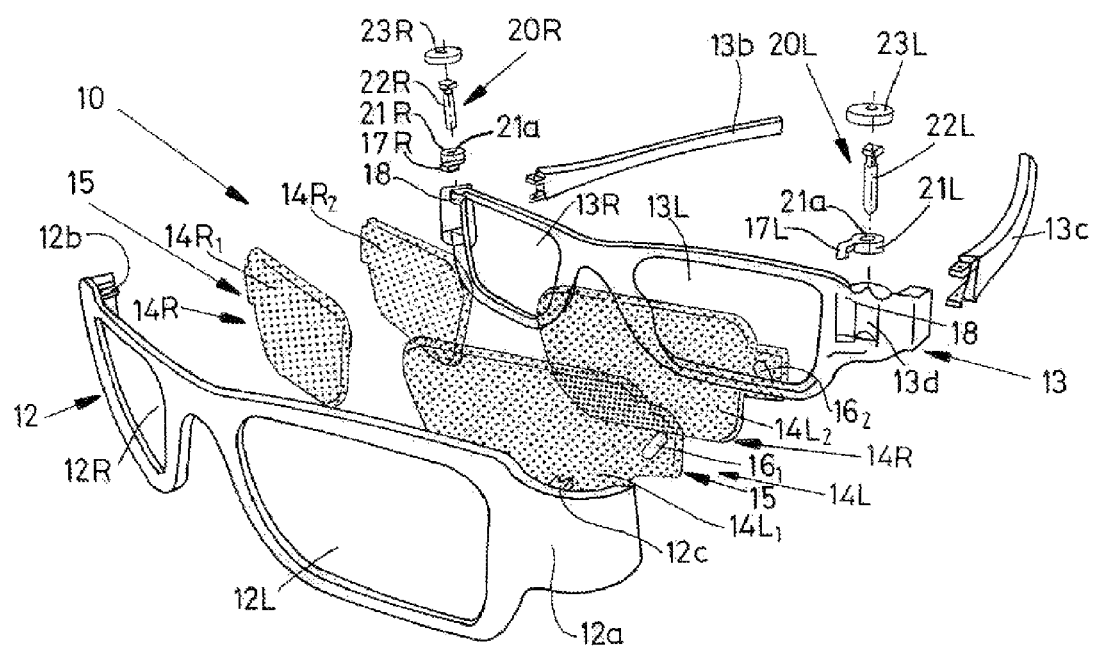

The invention also relates to spectacles provided with at least one combined lens according to the invention.

The object of the invention is therefore to provide a less complex combined eye glass according to the above preamble, with which it is possible to adjust the lens elements relative to one another with a mechanism that can be easily operated. According to the invention the displacement means comprise at least one cam element that can interact with at least one of the lens elements. This way a structure is realised that is not only simple and sound, but that also enables a simple adjustment by the wearer of the combined lens.

20 Claims, 6 Drawing Sheets

COMBINED LENS AND SPECTACLES PROVIDED WITH AT LEAST ONE SUCH COMBINED LENS

CROSS-REFERENCE TO RELATED APPLICATIONS

This application claims the benefit of priority of International Application No. PCT/NL2006/000140 filed Mar. 16, 2006, and Netherlands Patent Application No. 1028563 filed Mar. 17, 2005, which is relied on and incorporated herein by reference.

The invention relates to a combined lens comprising two lens elements lying behind one another along the optical axis of the lens and means for displacing at least one lens element relative to the other lens element in a plane perpendicular to the optical axis of the lens.

The invention also relates to spectacles provided with at least one combined lens according to the invention.

A combined lens of the aforementioned type is disclosed in U.S. Pat. No. 3,305,294. A drawback of the combined lens described in this US patent is the limited adjustability of the two lens elements relative to one another. The adjustment mechanism comprises a complex structure involving wire-shaped parts by means of which the position of at least one of the lens elements relative to the other cannot be realised in a very precise or stable manner, however.

The object of the invention is therefore to provide a less complex combined eye glass according to the above preamble, with which it is possible to adjust the lens elements relative to one another with a mechanism that can be easily operated.

According to the invention the moving means comprise at least one cam element that can interact with at least one of the lens elements. This way a structure is realised that is not only simple and sound, but that also enables a simple adjustment by the wearer of the combined lens.

More specifically, the displacement means are arranged to displace the two lens elements in opposite directions relative to each another. This will prevent any shifting of the optical axis of the combined lens, which will improve the ease of wearing and looking for the user.

In a functional embodiment the cam element is configured as a moveable notch that can be accommodated in a groove provided in at least one lens element. This way a form-closed structure is realised that makes it easy and reliable to adjust the combined lens.

More specifically, in one embodiment the notch can be displaced in a direction perpendicular to the direction of displacement of the lens elements.

In a functional embodiment of the combined lens according to the invention the notch comprises a bore provided with an internal screw thread in which a rotatable pin provided with an external screw thread can be accommodated. This guarantees a direct and permanent coupling of the notch with the groove and accordingly an accurate adjustment and locking of the lens elements.

More specifically, the groove is provided in a flange rim present at the outer circumference of the lens element, the groove being in a first embodiment designed as a straight groove. In another embodiment the groove is obliquely oriented relative to the direction of movement. In yet another embodiment the groove is configured as a curved groove.

More in particular, both lens elements are provided with a groove, which grooves overlap one another at least partly, in both of which grooves the notch can be accommodated. The grooves of the two lens elements may have a mirrored orientation relative to each another in that case, which will prevent shifting of the optical axis of the combined lens.

In yet another embodiment the notch is provided with a toothing that mates with a corresponding toothing provided on at least one of the lens elements. The cam element may then be designed as a rotatable pin that can be incorporated in a groove that is provided in at least one lens element and which is provided with a toothing, which groove extends in the direction of movement.

In two functional embodiments the rotatable pin may extend in a direction perpendicular or parallel to the optical axis.

Figure 2:
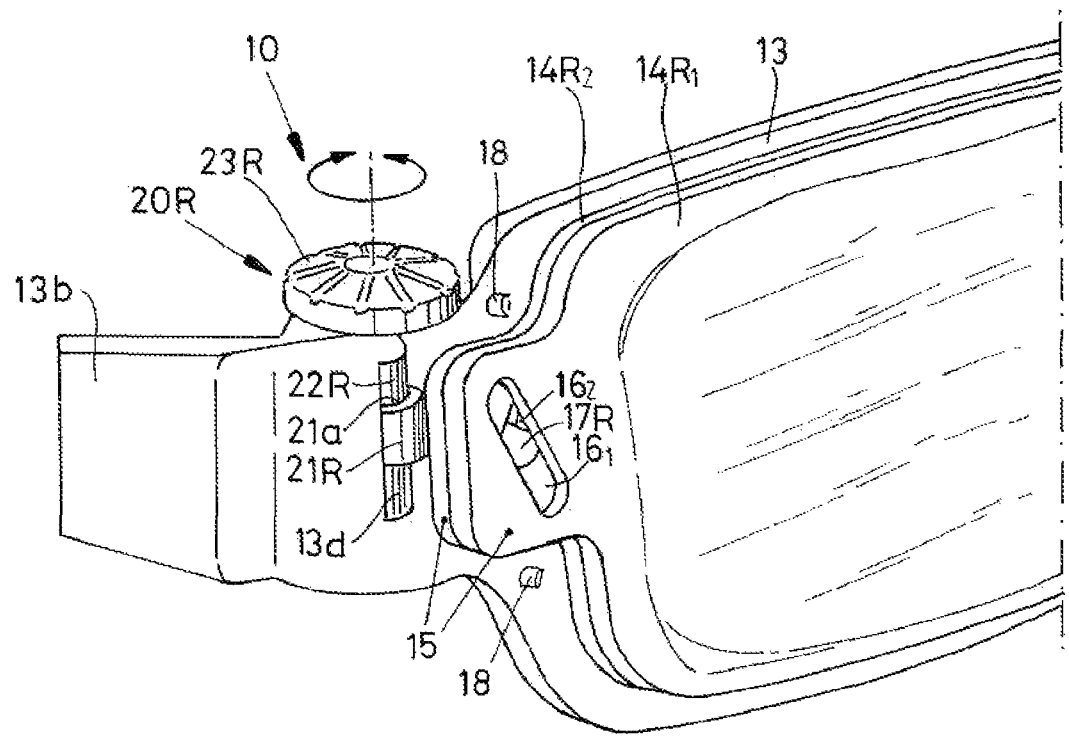
Figure 3:
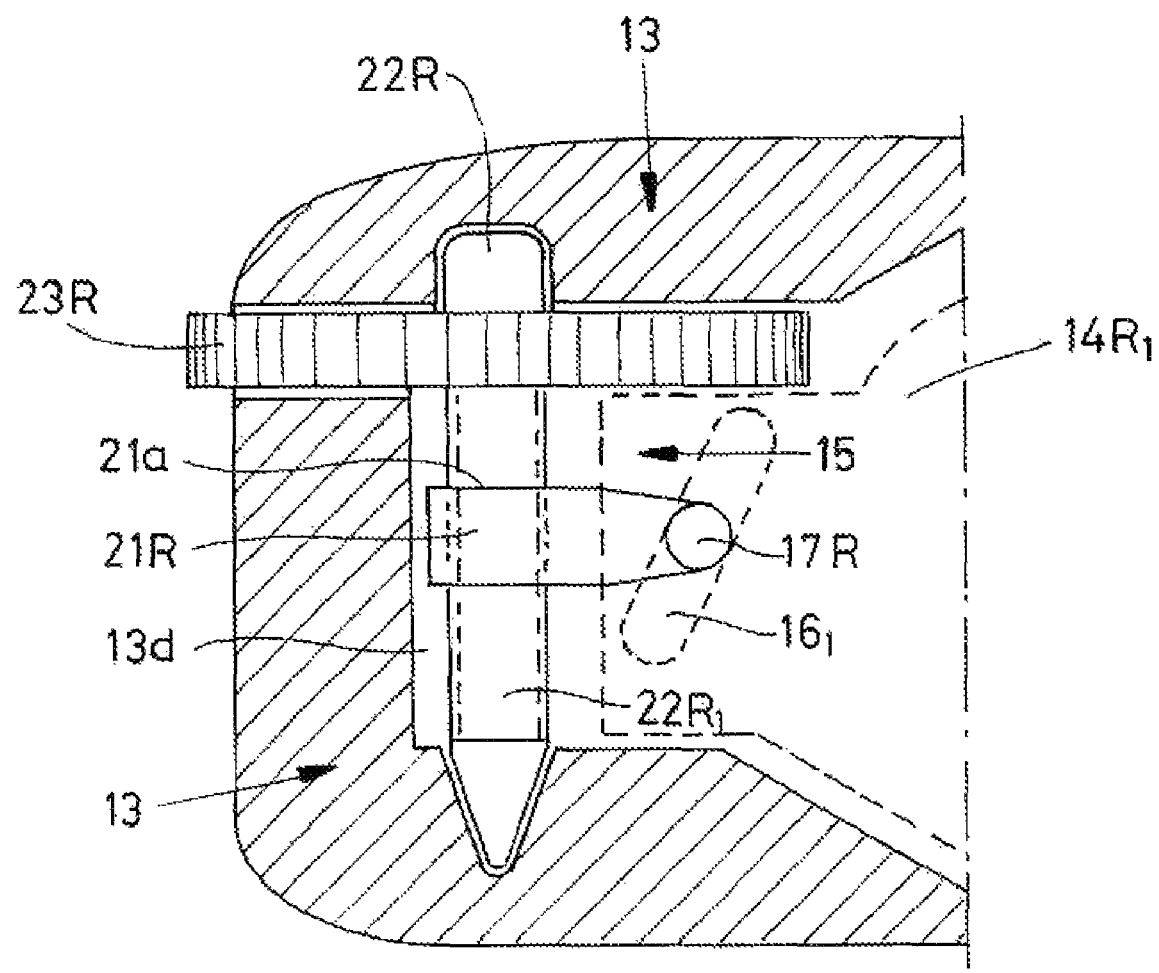
Figure 4:
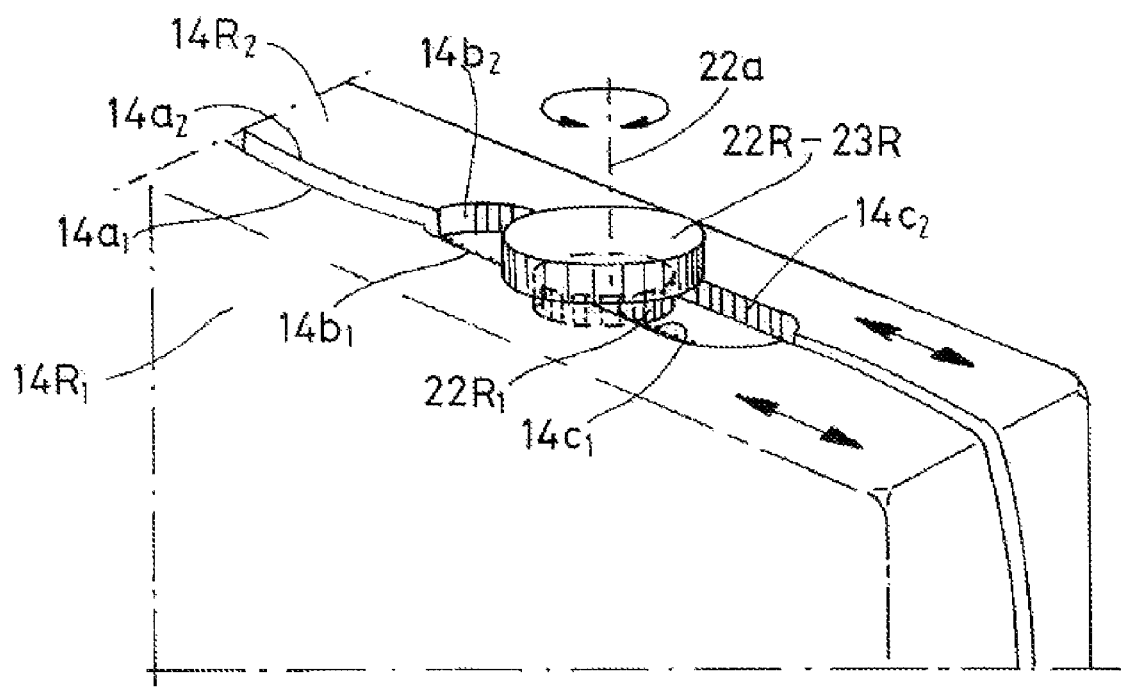
Figure 5:
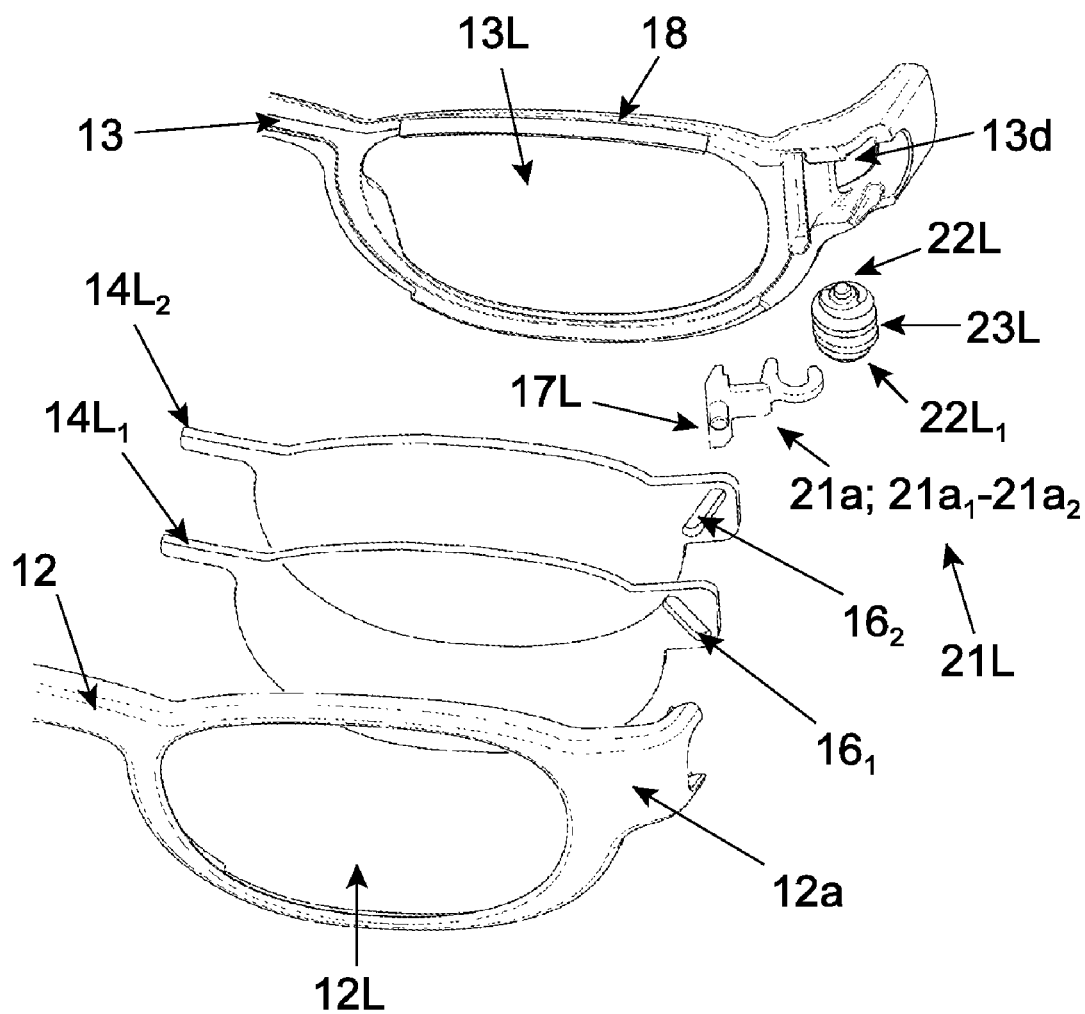

The invention will now be further elucidated with reference to a drawing, which drawing successively shows in:

FIG. 1 a first view of an embodiment of spectacles provided with at least one combined lens according to the invention;

FIG. 2 a detailed view of the spectacles shown in FIG. 1;

FIG. 3 a detailed view of another embodiment of a combined lens according to the invention;

FIG. 4 a detailed view of yet another embodiment of a combined lens according to the invention;

FIG. 5 another embodiment of a combined lens according to the invention; and

Figure 6:
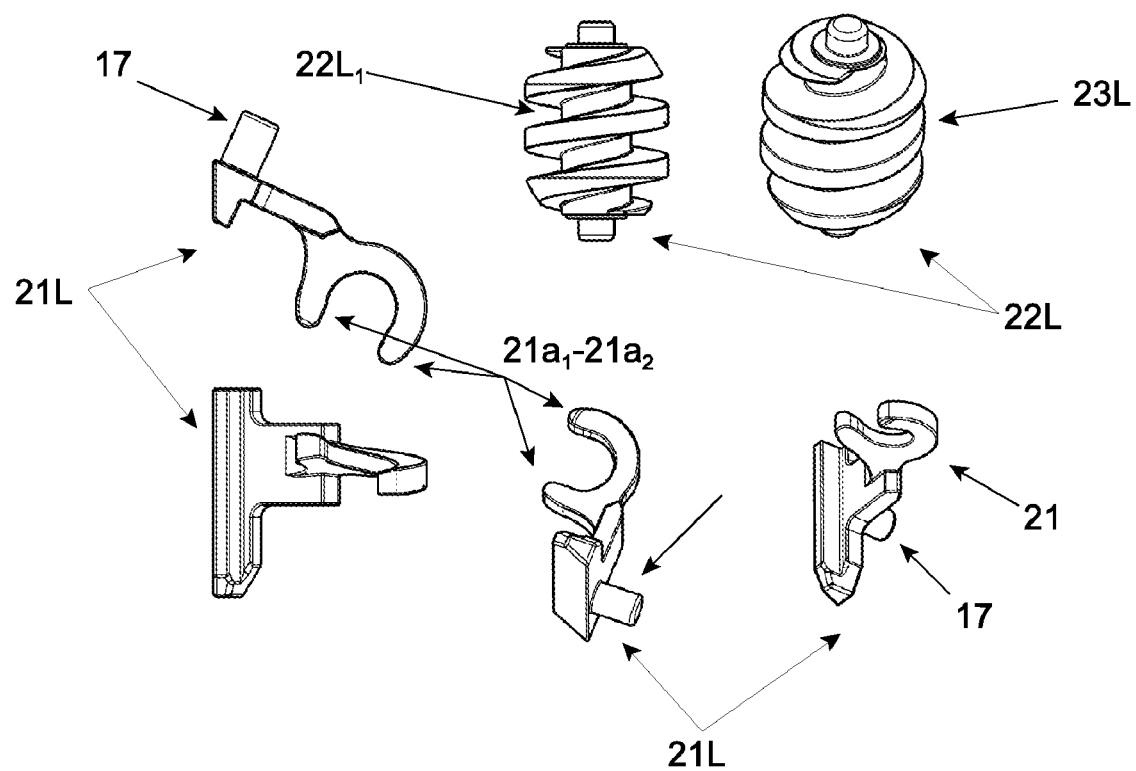

FIG. 6 a detailed view of the embodiment of the combined lens of FIG. 5.

For a better understanding of the invention in the following description, identical elements will be indicated by the same reference figure.

FIG. 1 discloses spectacles provided with two combined lenses according to the invention.

The spectacles 10 have a composite frame composed of frame parts 12 and 13, respectively, that can be connected to one another and spectacle legs 13$b$ and 13$c$. The composite spectacle frame 10 (12-13) has a left lens opening 12L-13L and 12R-13R, respectively. The front frame part 12 can, with the aid of connecting elements 12$b$-12$c$, be coupled to the second frame part 13 that is to this end provided with cooperating connecting elements 18. The connecting elements 18 are in this case designed as projections that can be clamped or clicked into connecting elements 12$b$-12$c$ designed as openings.

The two spectacle frame parts 12-13 can optionally be connected to one another by means of screw connections or a glue connection.

Combined lenses 14L and 14R can according to the invention be incorporated between the two frame parts 12-13 in the lens openings 12L-13L (12R-13R) thus formed. Each combined lens 14L (14R) is in this case composed of a front lens 14L$_1$ (14R$_1$) and a back lens 14L$_2$ and 14R$_2$, respectively. The two lens elements 14L$_1$-14L$_2$ (14R$_1$-14R$_2$) are positioned behind one another viewed in the direction of the optical axis.

Each lens element 14L$_1$-14L$_2$ (14R$_1$-14R$_2$) is provided with a flange 15 extending at the circumference rim of the lens element, provided with a groove 16$_1$ (16$_2$).

In this embodiment each lens element 14L.sub.1-14L.sub.2 (14R.sub.1-14R.sub.2) such a groove 16$_1$ and 16$_2$, respectively, which is obliquely oriented relative to the direction of movement perpendicular to the optical axis. More specifically the grooves 16$_1$ and 16$_2$ respectively, of each lens element 14L$_1$-14L$_2$ (14R$_1$-14R$_2$) have a mirrored orientation relative to one another.

For the displacement of one or both lens elements 14L.sub.1-14L.sub.2 and 14R.sub.1-14R.sub.2, respectively, relative to one another, displacement means 20L (20R) are provided, which comprise a cam element 21L (21R) provided with a notch 17L (17R) which acts as a cam element and which can be accommodated in at least one of the grooves 16$_1$ ($16_2$) of the front lens element $14L.sub.1$ ($14R.sub.1$) or $14L.sub.2$ ($14R.sub.2$), respectively, of the corresponding combined lens. More specifically, the notch 17L (17R) extends into both grooves $16_1$-$16_2$. The notch element 21L (21R) is in this case present in a recess 13d provided in the frame part 13. The notch element 21L (21R) is provided with a bore 21a in which a rotatable pin 22L (22R) can be accommodated. This rotatable pin 22L (22R) is in this case also accommodated in the recess 13d in the spectacle frame part 13.

More specifically, the bore 21a of each cam element 21L (21R) is provided with an internal screw thread $21L_1$ ($21R_1$) (not shown) that cooperates with an external screw thread $22L_1$ ($22R_1$) (not shown) on the rotatable pin 22L (22R). With the aid of a turning knob 23L (23R) provided at the end of the rotatable pin 22L (22R) projecting from the spectacle frame part 13, the rotatable pin 22L (22R) can be rotated by hand so that the cooperating threads $21L_1$-$22L_1$ ($21R_1$-$22R_1$) will cause the cam element 21L (21R) to move along the rotatable pin 22L (22R) together with the notch 17L (17R).

Because the notch 17L (17R) extends into the two grooves $16_1$-$16_2$ of the two lens elements $14L.sub.1$-$14L.sub.2$ ($14R.sub.1$-$14R.sub.2$), and the fact that the notch 17L (17R) is accommodated in the spectacle frame assembly 12-13, the two lens elements $14L.sub.1$-$14L.sub.2$ and $14R.sub.1$-$14R.sub.2$, respectively, are displaced relative to one another in a direction of movement perpendicular to the optical axis of the combined lens.

More specifically, this movement takes place in a plane perpendicular to the optical axis of the combined lens 14.

In this way, the strength of the spectacles can be simply adjusted by the users themselves by turning the rotatable pin 22L (22R) so that the two lens elements will be displaced relative to one another by means of the cam element 21L-21R (the notch 17L-17R).

It will be clear that the turning knob 23L (23R) may be positioned not only on top of the spectacle frame 12-13 (as shown in FIGS. 1 and 2), but may in an analogous manner be positioned at the bottom of the spectacle frame.

FIG. 3 shows a different embodiment of the displacement means 20L (20R) in which the turning knob 23R is incorporated in the spectacle frame part 13. By analogy with the embodiment shown in FIGS. 1 and 2, the turning knob 23R is provided on the rotatable pin 22R so that this pin 22R can be rotated by hand. In an analogous manner the cam element 21R can be moved along the rotatable pin 22R together with the notch 17R under the influence of the cooperating threads $21R_1$-$22R_1$.

The turning knob 23R is, together with the rotatable pin 22R, entirely accommodated in the recess 13d in the spectacle frame part 13.

FIG. 4 shows yet another embodiment of a combined lens according to the invention. In this figure use is made of the reference numerals of a combined right lens that is composed of two lens elements $14R_1$-$14R_2$. The two lens elements $14R_1$-$14R_2$ are provided with a lens profile $14a_1$-$14a_2$, which lens profiles face each another and thus constitute the combined lens. Both lens elements $14R_1$-$14R_2$ are provided with a recess $14b_1$-$14b_2$ and a toothing $14c_1$-$14c_2$. The cam element according to the invention, which can be coupled with one, and in the case of this embodiment, both lens elements $14R_1$-$14R_2$, can be accommodated in the groove thus formed by the recesses $14b_1$-$14b_2$.

The coupling element is here designed as the rotatable pin 22R-23R which, contrary to the embodiment shown in FIGS. 1-3, is provided with a toothing instead of a thread $22R_1$, which toothing interlocks with the toothing $14c_1$-$14c_2$. In this embodiment the rotatable pin 22R with the toothing $22R_1$ is present in the spectacle frame 12-13 (not shown) and can be simply rotated by the user around its elongated axis 22a so that the two lens elements $14R_1$-$14R_2$ are displaced relative to one another in the plane perpendicular to the optical axis of the combined lens.

In another embodiment only one of the lens elements $14R_1$-$14R_2$ may of course be provided with a toothing $14c_1$ or $14c_2$ so that only one of the lens elements can be displaced relative to the other, which is fixed in the spectacle frame.

In the embodiment shown in FIG. 4 the rotatable pin extends parallel to or in the plane of movement and perpendicularly to the optical axis with its rotation axis 22a.

In another embodiment (not shown), one of the lens elements $14R_1$-$14R_2$ is provided with a flange rim 15 with a groove $16_1$-$16_2$ analogous to the lens elements as shown in FIGS. 1-3. In this other embodiment the groove is not oriented at an angle relative to the direction of movement, however, but the groove $16_1$-$16_2$ in question is configured as a straight groove that extends parallel to the direction of movement. The rotatable pin 32R of FIG. 4 in this case extends into the groove $16_1$-$16_2$ in question.

By analogy with FIG. 4, the groove $16_1$-$16_2$ in question is provided with a toothing that mates with the toothing $22R_1$ of the rotatable pin 22R. The rotatable pin 22R in this case extends parallel to the optical axis and perpendicularly to the plane in which the lens element in question is displaced during the adjustment of the combined lens.

The turning knob 23R in this case lies at the front of the spectacle frame 12-13.

The interlocking of the toothing of the rotatable pin 22R with the toothing provided in one or both grooves $16_1$-$16_2$ ensures a relative displacement of one or both lens elements in a plane on the optical axis and perpendicular to the rotation axis of the rotatable pin 22R.

FIG. 5 shows a different embodiment of a combined lens according to the invention, while FIG. 6 is a detailed view of this embodiment.

The embodiment shown in FIGS. 5 and 6 shows an alternative design of the displacement means 20L (20R). By analogy with the embodiment in FIGS. 2, 3 and 4 the displacement means 20L (20R) also comprise a cam element 21L (21R) provided with a notch 17L (17R) that acts as a cam element and can be accommodated in at least one of the grooves $16_1$ ($16_2$) of the front lens element $14L.sub.1$ ($14R.sub.1$) or $14L.sub.2$ ($14R.sub.2$), respectively, of the corresponding combined lens.

For a better visualisation of the latter embodiment, the two lens elements $14L_1$ and $14L_2$ (or $14R_1$-$14R_2$), respectively, are not shown.

By analogy with the previously shown embodiment, the notch 17L (17R) extends into the recess 13d in the frame part 13. The cam element 21L (21R) is provided with a projecting part 21a consisting of two legs $21a_1$-$21a_2$, which can be accommodated in the groove $22L_1$ ($22R_1$) of the thread helix-like element 22L (22R). This thread helix-like element 22L (22R) is also accommodated in the recess 13d of the spectacle frame part 13.

The dimensions of the thread helix-like element 22L (22R) are such that at least part of the surface of the thread helix-like element 22L (22R) extends to beyond the recess 13d in the spectacle frame part 13. The surface of the thread helix-like element 22L (22R) in this case acts as an adjustment surface 23L (23R) by analogy with the turning knob 23L (23R) as shown in FIGS. 1-3. In this way turning of the thread helix-like element 22L (22R) by the user results in adjustment of the cam element 21L (21R) by the coupling of the legs 21a₁-21a₂ or the projecting part 21a in the groove 22L₁ of the thread helix-like element 22L.

The notch 17L (17R) is also adjusted accordingly, as a result of which the two lens elements 14L₁-14L₂ (14R₁-14R₂, respectively) are displaced.

With the present invention a simple yet effective structure is realised which enables the user to adjust the lens strength of the spectacles himself in an effective manner.

The invention claimed is:

1. A combined lens for spectacles comprising
   two lens elements lying behind one another along the optical axis of the lens; and
   means for displacing at least one lens element relative to the other lens element in a plane perpendicular to the optical axis of the lens, thereby adjusting the lens strength of the spectacles, said displacement means comprising at least one cam element that can interact with at least one of the lens elements.

2. A combined lens according to claim 1, characterized in that the displacement means are arranged to displace the two lens elements in opposite directions relative to each another.

3. A combined lens according to claim 1, wherein said cam element is configured as a movable notch which can be accommodated in a groove provided in at least one lens element.

4. A combined lens according to claim 3, characterized in that the notch can be displaced in a direction perpendicular to the direction of movement of at least one of said lens elements.

5. A combined lens according to claim 3, wherein the notch has a bore having an internal screw thread to accommodate a rotatable pin having an external screw thread.

6. A combined lens according to claim 3, characterized in that the groove is provided in a flange rim at the outer circumference of the lens element.

7. A combined lens according to claim 3, characterized in that, the groove is configured as a straight groove.

8. A combined lens according to claim 7, characterized in that the groove is obliquely oriented relative to the direction of movement.

9. A combined lens according to claim 3, characterized in that the groove is configured as a curved groove.

10. A combined lens according to claim 3, characterized in that both lens elements are provided with a groove, which grooves overlap one another at least in part, in both of which grooves the notch can be accommodated.

11. A combined lens according to claim 10, characterized in that the grooves of the two lens elements have a mirrored orientation relative to each another.

12. A combined lens according to claim 1, characterized in that the cam element is provided with a toothing that mates with a corresponding toothing on at least one of the lens elements.

13. A combined lens according to claim 12, characterized in that the cam element is configured as a rotatable pin that can be accommodated in a groove that is provided in at least one lens element and that is provided with a toothing, which groove extends in the direction of movement.

14. A combined lens according to claim 12, characterized in that the rotatable pin extends in a direction perpendicular to the optical axis.

15. A combined lens according to claim 12, characterized in that the rotatable pin extends parallel to the optical axis.

16. A combined lens for spectacles comprising
    two lens elements lying behind one another along the optical axis of the lens, and
    means for displacing at least one lens element relative to the other lens element in a plane perpendicular to the optical axis of the lens, said displacement means comprising at least one cam element configured as a movable notch which can be accommodated in a groove provided in at least one lens element, said notch having a bore with an internal screw thread to engage a rotatable pin having an external screw.

17. A combined lens for spectacles comprising
    two lens elements lying behind one another along the optical axis of the lens, and
    means for displacing at least one lens element relative to the other lens element in a plane perpendicular to the optical axis of the lens, said displacement means comprising at least one cam element that can interact with at least one of the lens elements, wherein said cam element is configured as a movable notch which can be accommodated in grooves provided in both lens elements, the grooves overlapping one another at least in part.

18. A combined lens according to claim 17, characterized in that the grooves of the two lens elements have a mirrored orientation relative to each another.

19. A combined lens according to claim 17, characterized in that the displacement means are arranged to displace the two lens elements in opposite directions relative to each another.

20. A combined lens according to claim 17, characterized in that each groove is provided in a flange rim at the outer edge of the corresponding lens element.

\* \* \* \* \*